United States Patent [19]

Platzer et al.

[11] Patent Number: 4,825,138
[45] Date of Patent: Apr. 25, 1989

[54] BRUSHLESS SYNCHRONOUS MOTOR WITH SHORT-CIRCUITED PROTECTIVE WINDING FOR THE FIELD WINDING OF THE ROTOR

[75] Inventors: Hubert Platzer; Helmut Roland, both of Linz, Austria

[73] Assignee: Dipl. Ing. Hitzinger Gesellschaft mbH, Linz, Austria

[21] Appl. No.: 65,324

[22] Filed: Jun. 22, 1987

[30] Foreign Application Priority Data

Jul. 10, 1986 [AT] Austria ................................ 1867/86

[51] Int. Cl.$^4$ .............................................. H02P 1/46
[52] U.S. Cl. ..................... 318/716; 318/718; 318/712
[58] Field of Search ............... 318/700, 705, 710, 711, 318/712, 821, 813, 716, 717, 718, 782; 310/163

[56] References Cited

U.S. PATENT DOCUMENTS

| | | | |
|---|---|---|---|
| 3,449,652 | 6/1969 | Ishizaki | 318/718 |
| 3,461,368 | 8/1969 | Haller | 318/716 |
| 3,748,555 | 7/1973 | Hoffman | 318/718 |

FOREIGN PATENT DOCUMENTS 0647681 12/1950 United Kingdom ................ 318/716

*Primary Examiner*—Bentsu Ro
*Attorney, Agent, or Firm*—Kurt Kelman

[57] ABSTRACT

In a brushless synchronous motor in which a short-circuited protective winding (9) is associated with the field winding (2) of the rotor the starting conditions are improved in that the protective winding (9) consists of two winding sections (10, 11), which have different numbers of turns and are either wound in mutually opposite senses or are wound in the same sense but connected in opposition.

4 Claims, 1 Drawing Sheet

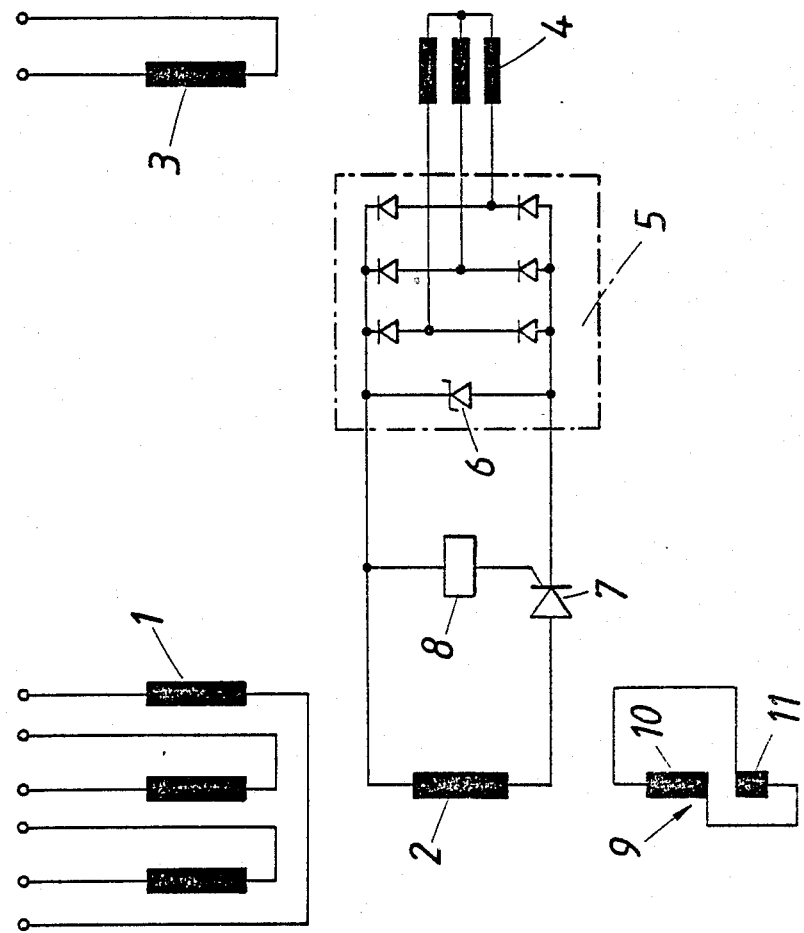

BRUSHLESS SYNCHRONOUS MOTOR WITH SHORT-CIRCUITED PROTECTIVE WINDING FOR THE FIELD WINDING OF THE ROTOR

BACKGROUND OF THE INVENTION

1. Field of the Invention

This invention relates to a brushless synchronous motor comprising a short-circuited protective winding associated with the field winding of the rotor.

2. Description of the Prior Art

It is desirable to limit the voltages which are induced in the field winding of the rotor of a synchronous motor when the latter is started from standstill and to protect the switching means which are required for the feeding of the field winding and consist particularly of rectifiers and transistors from excessive overvoltages during an asynchronous start of the motor. This is usually accomplished in that the field winding is shunted by a protective resistor. By the provision of a protective resistor which has a resistance of an order of five to ten times the rotor resistance and shunts the field winding of the rotor, the voltage that is induced in the field winding is limited to a permissible value and the residual slip occurring during the transition from the asynchronous start to the synchronized operation is decreased. Besides, the hunting torque which occurs near the synchronous speed can be highly reduced so that the starting characteristics are generally improved. But the provision of such protective resistors involves the disadvantage that the resistors must be accommodated in the rotor so that expensive mounting means are required to take up the centrifugal force. Besides, the protective resistors result in a Joule's heat loss even during normal operation because the protective resistors always hunts the field winding of the rotor.

In a known circuit designed to avoid said disadvantages the protective resistor has been replaced by a short-circuited protective winding, in which currents are induced during the asynchronous start and attenuate the alternating fields established adjacent to the field winding. During a synchronous operation the rotating field does not move relative to the rotor and to the protective winding so that losses which would adversely affect the efficiency of the motor cannot occur during normal operation. Another advantage resides in that a stable structure is obtained because additional mechanical supports are not required. But by a short-circuited protective winding of that kind the asynchronous torques and the hunting torques can be influenced only because the protective winding is interlinked with the stator field so that the design of a synchronous motor for desired starting characteristics is adversely affected.

SUMMARY OF THE INVENTION

It is an object of the invention to avoid these disadvantages and to provide a brushless synchronous motor which is of the kind described first hereinbefore and which is so improved with simple means that the advantages which are afforded by the use of a protective resistor during the asynchronous start can be obtained also where a short-circuited protective winding is employed.

That object is accomplished in accordance with the invention in that the short-circuited protective winding consists of two winding sections which have different numbers of turns and which are wound in mutually opposite senses or are wound in the same sense and connected in opposition.

Because the two winding sections of the protective winding are either wound in mutually opposite senses or are wound in the same sense and connected in opposition, said winding sections will produce mutually opposite electric actions, which will partly offset each other in the short-circuited protective winding. As the numbers of turns of the two winding sections can freely be selected relative to each other and the protective winding has a certain resistance, that protective winding can be used to effect a voltage limitation as well as an optimizing of the asynchronous torque and of the hunting torque under given conditions and this can be achieved even when that protective winding is interlinked with the entire main field.

A particularly simple structure will be obtained if the short-circuited protective winding consists in part of a bifilar winding.

Brief Description of the Drawing

The single FIGURE of the drawing is an electric block circuit diagram illustrating a brushless synchronous motor in accordance with an illustrative embodiment of the invention.

Detailed Description of the Preferred Embodiment

In the usual manner the illustrated synchronous motor comprises a stator and a rotor. The stator comprises a three-phase winding 1. The rotor comprises a field winding 2, which is fed by an exciter machine having a stator winding 3 and a rotor winding 4. An alternating current is induced n the rotor winding of the exciter machine and is rectified by a rotating rectifier 5, which is associated with the rotor of the synchronous motor and is protected by a surge arrester 6. The rectified current excites the field winding 2. A control is effected by a thyristor 7 that is provided with a firing circuit 8.

The present synchronous motor differs from conventional ones in that its rotor is provided in addition to the field winding 2 with a short-circuited protective winding 9, which is magnetically coupled to the field winding 2 and is composed of two winding sections 10, 11, which are connected in series and have different numbers of turns and are wound in mutually opposite senses so that the voltages induced in the winding sections 10 and 11 by the current flowing in the field winding 2 during the start of the synchronous motor from a standstill will partly offset each other and will give rise to a short-circuit current. In view of the alternating fields being established, that short-circuit current will be determined by the ratio of the numbers of turns of the two winding sections 10 and 11. As a result, the voltage induced in the field winding can be limited and the asynchronous torque and the hunting torque can be influenced so that the motor can be designed to have starting characteristics which can otherwise be obtained only by a protective resistor.

The protective winding 9 may be provided in a relatively simple manner because, e.g., the field winding 2 may be provided on the protective winding 9, which consists in part of a bifilar winding that has been wound on the pole shanks of the rotor. Different arrangements of the protective winding may be adopted. Because the winding sections 10 and 11 are wound in mutually opposite senses, a complete interlinking between the protective winding 9 and the main field is not essential and it is not necessary to enter the fringe region for obtaining certain desired starting characteristics as an exact control is provided by the ratio of the numbers of turns of the two winding sections 10 and 11. It will be understood that a protective winding consisting of two mutually oppositely wound winding sections can be replaced by a protective winding consisting of two winding sections which are wound in the same sense and connected in opposition to each other because in both cases the winding sections are oppositely poled as regards the voltages which are inducible therein by a current flowing in the field winding 2.

We claim:

1. A brushless synchronous electric motor comprising
    a rotor,
    a field winding carried by said rotor, and
    a short-circuited protective winding magnetically coupled to said field winding and adapted to have a voltage induced therein by a current flowing in said field winding, said protective winding comprising
    two winding sections having different numbers of turns, the winding sections being connected in series and being mutually oppositely poled as regards the voltages which are inducible therein by the current flowing in said field winding.

2. The brushless synchronous electric motor set forth in claim 1, wherein said winding sections are wound in mutually opposite senses.

3. The brushless synchronous electric motor set forth in claim 1, wherein said winding sections are wound in the same sense and connected in opposition to each other.

4. A brushless synchronous electric motor comprising
    a rotor,
    a field winding carried by said rotor, and
    a short-circuited protective winding magnetically coupled to said field winding, said protective winding
    consisting in part of a bifilar winding and comprising two winding sections having different numbers of turns and being mutually oppositely poled as regards the voltages which are inducible therein.

* * * * *